K. W. LINDMAN.
BALL BEARING.
APPLICATION FILED APR. 10, 1918.

1,373,139. Patented Mar. 29, 1921.

Inventor:
Konrad W. Lindman

UNITED STATES PATENT OFFICE.

KONRAD WERNER LINDMAN, OF STOCKHOLM, SWEDEN, ASSIGNOR, BY MESNE ASSIGNMENTS, TO NORDISKA KULLAGER AKTIEBOLAGET, OF GOTTENBORG, SWEDEN, A LIMITED COMPANY OF SWEDEN.

BALL-BEARING.

1,373,139.  Specification of Letters Patent.  Patented Mar. 29, 1921.

Application filed April 10, 1918. Serial No. 227,618.

*To all whom it may concern:*

Be it known that I, KONRAD WERNER LINDMAN, subject of the King of Sweden, residing at Västra Trädgårdsgatan 4, Stockholm, in the Kingdom of Sweden, have invented certain new and useful Improvements in Ball-Bearings; and I do hereby declare the following to be a full, clear, and exact description of the invention, such as will enable others skilled in the art to which it appertains to make and use the same.

The present invention relates to a two-rowed ball bearing with the outer ring made in one piece, and the inner ring made, reckoned along the shaft of the bearing, in two or more pieces, whereby the bearing is rendered easily adjustable even after having been in use a considerable length of time.

On the accompanying drawing is shown, by way of example, a form of the invention.

Figure 1:
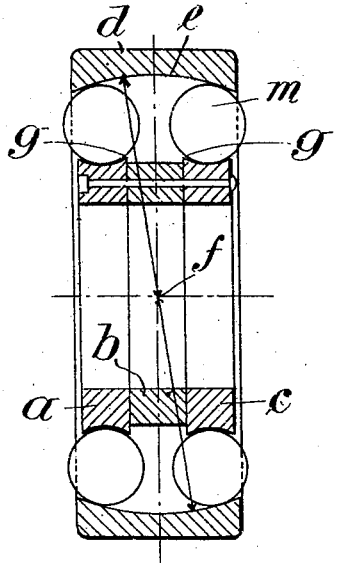
Figure 2:
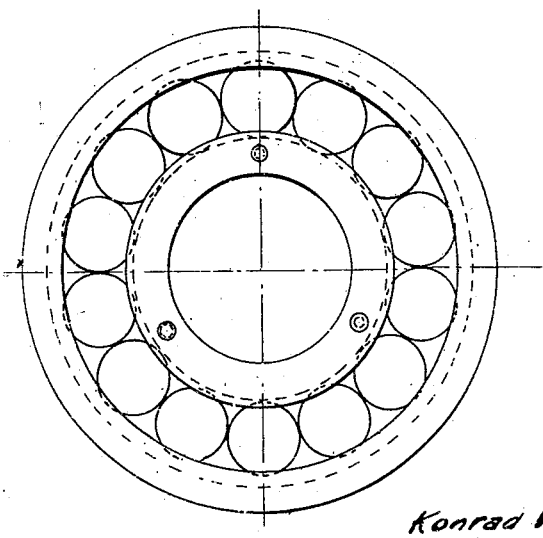

Figures 1 and 2 show the shaft in an axial direction, and viewed from the side, respectively.

The ball bearing consists of an inner ring $a$, $b$, $c$, intended to be securely fixed on the shaft, and an outer ring $d$, intended to be placed in a firm casing (bearing frame). The outer ring $d$ has a ball-path $e$ of spherical shape with its center situated in $f$ on the center line of the bearing. The inner ring consists of the parts $a$, $b$ and $c$, detachable from one another, of which parts $a$ and $c$ are the ball bearing parts, which are provided each with its ball-path for the balls. The balls $m$ are placed in two rows between the ball-paths.

By means of the described construction has been produced a bearing which, if the balls, owing to wear and tear, have worked loose in the ball-race, may easily be adjusted in the manner that the intermediate piece $b$ is exchanged for a broader piece, as in this way the two ball bearing parts $a$ and $c$ will be removed axially apart from one another, which causes the inner path of the balls to approach somewhat to the spherical ball path of the outer ring, and the play ceases.

This construction entails also another very important technical advantage. Owing to the fact that the outer ring which, in a manner which in itself is known, is made in one single piece and provided with a spherical ball path, and is combined with the above-mentioned arrangement of the inner ring, there is obtained, in addition to the adjustability, the advantage that, on account of the pressure of the balls against the outer ring, pressure components are produced which press the parts of which the inner ring is composed against one another, whereby the risk of a separation of the said parts (bursting of the inner ring), by action of the pressure arising while the bearing is in use, is obviated. And, owing to the fact, that the outer ring is made in one piece—instead of being composed of several parts—there are avoided first dislocations of the spherical shape of the outer ball path, and secondly devices for holding together the outer ring, on which the pressure components act outwardly, *i. e.* with a tendency to burst it, and not so as to hold it together, as in the case of the inner ring.

As is apparent from the drawing (Fig. 1), the inner edges $g$, viewed in an axial direction, of the parts $a$, $c$ of the inner ring, which are provided with ball paths or grooves, extend farther out from the center line of the bearing than the part $b$ arranged between them, *i. e.* the said inner edges project some distance in front of the adjacent edges of the part $b$, or, if there are several intermediate parts, in front of the edges of an adjacent intermediate part at the periphery. Hereby is obtained the advantage that the bearing is not so easily damaged by strong axial pressure, inasmuch as the projecting part $g$, which is without abutment, in the case of strong axial pressure of the balls, by reason of its elasticity, yields a little, so that the axial stresses on the rings are more gentle.

Having thus described my invention, I declare, that what I claim is:—

1. A ball bearing comprising a plurality of rows of balls, an outer bearing member having its inner face in the form of the equatorial zone of a sphere with its center on the center line of the bearing and an inner bearing member composed of a plurality of rings each formed with a groove constituting a ball-path, and means adapted to be detachably secured between the grooved rings for holding the same in proper spaced relation to bring the balls into contact with the outer bearing member.

2. A ball bearing comprising a pair of rows of balls, an outer bearing member having its inner face in the form of the equatorial zone of a sphere with its center on the center line of the bearing and an inner bearing member composed of a pair of rings each formed with a ball-path and a ring detachably secured between the rings of the pair for holding the same in proper spaced relation to bring the balls into contact with the outer bearing member.

3. A ball bearing comprising a plurality of rows of balls, an outer bearing member having its inner face in the form of the equatorial zone of a sphere with its center on the center line of the bearing, and an inner bearing member comprising a plurality of rings each formed with a groove constituting a ball-path, and rings detachably secured between each of the grooved rings for holding the same in proper spaced relation to bring the balls into contact with the outer bearing member, the outside diameter of the detachable rings being less than the diameter of the outer edges of the grooved rings so that the edges of the grooved rings project beyond the detachable rings to form a yielding edge of the ball-path.

In testimony whereof I affix my signature.

KONRAD WERNER LINDMAN.

Witnesses:
   Aug. Hagelin,
   Alma Pettersson.